Patented Sept. 5, 1944

2,357,554

UNITED STATES PATENT OFFICE 2,357,554

ANODIC TREATMENT OF FERROUS METALS

Joseph N. Sears, San Francisco, Calif., assignor to Schlage Lock Company, San Francisco, Calif.

No Drawing. Application July 20, 1942, Serial No. 451,556

1 Claim. (Cl. 204—56)

This invention relates to the coating of ferrous metals by anodic action and especially to a method whereby steel is embedded from .0002 inch to .0004 inch with a rust and wear-resisting, dead black, non-staining coating composed of ferric acetate.

According to the present invention an electrolytic solution is employed which requires—

Lead acetate—7 to 10 ounces per gallon of water.

Di octyl sodium sulfo succinate—2 ounces per gallon of water.

Ammonium hydroxide—1/30 ounce per gallon of water.

Current density—10/60 amperes per square foot of anode surface.

Voltage—9 to 16 volts across busbars.

Temperature—75° to 96° F.

In general, the solution may vary quite widely without effecting the process. Changes in the solution may be made to cope with various types and sizes of work.

The invention is applicable to ferrous metals in general and especially to cast iron and steel, wrought iron, cold rolled steel and the like. The process requires thorough cleaning of the material to be treated in an alkaline cleaner to remove any oil or dirt from the surface of the work. After cleaning, the material to be treated is submerged in the solution for a period ranging from one to six minutes—the material to be treated forming the anode of the circuit. Lead is plated out of the solution on to the iron strips acting as cathodes during the plating operation, and as the lead is plated out, the active acetate radical reacts with the surface of the steel to form a coating of ferric acetate. The plating or coating action continues as long as the work is submerged and current is applied, and the material changes in color from the original through a rainbow mixture and finally to a dead black. The di octyl sodium sulfo succinate in the solution is employed to lower the surface tension on the anode or material being treated thereby insuring a greater penetration.

After a satisfactory surface has been made on the anode or the material to be treated, it is removed from the solution and rinsed in hot water. Following this rinse, the work is immersed in a 5% water soluble oil solution for about 30 seconds.

The ferric acetate coating formed on the material during the anodic treatment is fairly porous and has a great affinity for water and oil. This is the reason for immersing it in the 5% water soluble oil solution as the oil is taken up and fills the pores of the ferrous acetate, also the water soluble oil permits the work to be lacquer finished or additional oil to be applied by rubbing.

Lead plated out during the process can be reclaimed to lead acetate at daily or weekly intervals by the addition of acetic acid. The pH or hydrogen ion concentration of the lead acetate solution thus reclaimed or reformed can be corrected by the addition of a suitable amount of ammonium hydroxide. The pH reading of the electrolytic solution should be about 7, or in other words slightly on the alkaline side of the pH scale.

The coating formed by this treatment is from .0002 to .0004 of an inch thick depending upon the time the material is allowed to be subjected to the anodic treatment. The surface formed is ferric acetate; it is dead black in color and forms an ideal rust and wear-resisting non-staining surface which is particularly adaptable for hardware finish and the like.

While certain features of my invention have been more or less specifically described, I nevertheless wish it understood that changes may be resorted to within the scope of the appended claim.

Having thus described my invention, what I claim and desire to secure by Letters Patent is:

The method of producing a coating of ferric acetate on a ferrous metal, which comprises subjecting the ferrous metal as anode to electrolytic treatment in an electrolyte consisting of from 7 to 10 ounces of lead acetate per gallon of water, di octyl sodium sulfo succinate—2 ounces per gallon of water, a sufficient amount of ammonium hydroxide to render the electrolyte slightly alkaline and employing a current tensity of ten to sixty amperes per square foot of anode surface and at nine to sixteen volts.

JOSEPH N. SEARS.